United States Patent [19]

Brems

[11] 4,394,897
[45] Jul. 26, 1983

[54] PALLET REGISTRY MECHANISM AND TRANSFER LIFT SYSTEM

[76] Inventor: John H. Brems, 32867 White Oaks Trail, Birmingham, Mich. 48010

[21] Appl. No.: 206,701

[22] Filed: Nov. 14, 1980

[51] Int. Cl.³ .............................................. B65G 47/00
[52] U.S. Cl. ................................................... 198/345
[58] Field of Search ............... 198/345, 774, 773, 742, 198/721

[56] References Cited

U.S. PATENT DOCUMENTS

| | | | |
|---|---|---|---|
| 3,155,217 | 11/1964 | Cross | 198/345 |
| 3,578,412 | 5/1971 | Martin | 198/721 X |
| 3,968,869 | 7/1976 | Stalker | 198/345 |
| 4,148,400 | 4/1979 | Cross | 198/345 X |
| 4,201,284 | 5/1980 | Brems | 198/345 |

Primary Examiner—John J. Love
Assistant Examiner—Paul A. Sobel
Attorney, Agent, or Firm—Barnes, Kisselle, Raisch, Choate, Whittemore & Hulbert

[57] ABSTRACT

A multiple station transfer machine used in automation equipment wherein multiple work carrying pallets are moved to various stations, located, and clamped for a machining operation. A mechanism for operating a group of clamping members with a common power source but the locating pins and the clamping members are individually actuated by individual internal elastic members acting through high efficiency mechanisms such as levers, pivots and rolling contacts. The invention contemplates a simplified lift and carry type pallet transfer or a vertically moving slide rail system operable by, and in conjunction with, and in proper sequence to, the actuating means for the registry locating and clamping mechanism.

4 Claims, 10 Drawing Figures

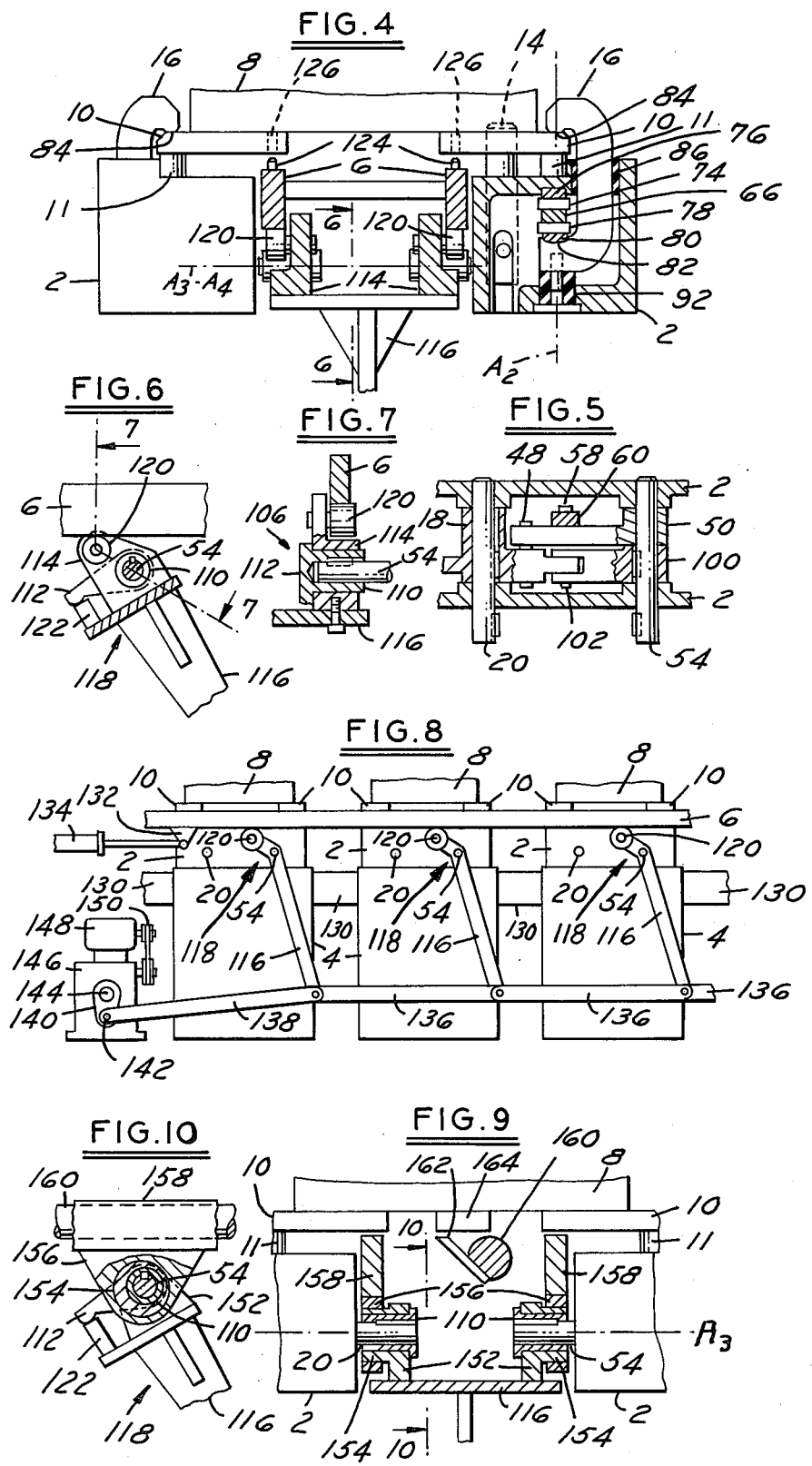

PALLET REGISTRY MECHANISM AND TRANSFER LIFT SYSTEM

FIELD OF INVENTION

Multiple station transfer machines for use in automation equipment using multiple work-carrying pallets which are moved to various stations, located accurately by a registry device and clamped in place for the initiation and completion of a particular machining operation.

BACKGROUND AND OBJECTS OF THE INVENTION

In some types of automatic workpiece processing, workpieces are located and clamped in pallets and the pallets are progressively transferred from station to station of a multiple station transfer machine on slide rails or the like. In each station, these pallets are accurately located and clamped by a mechanism referred to as a pallet registry.

Pallet registries of a variety of types have been in use in industry for many decades. Several such registry mechanisms are shown in U.S. Pat. Nos. 2,672,675; 2,673,386; 3,155,217; 3,571,872; 3,968,869; 4,201,284; and my copending application, Ser. No. 164,092, filed June 30, 1980 now U.S. Pat. No. 4,362,233. Reference is also made to my copending application, Ser. No. 196,216 filed Oct. 14, 1980, now U.S. Pat. No. 4,360,097. These pallet registries and others can be categorized into two types: a first type, in which each registry is operated by one or more hydraulic cylinders, and a second type in which multiple registries are ganged together and operated by a single power source such as a cylinder or suitable mechanical device.

Registries of the first type, which are self-powered, employ locating pins and clamps which may be mechanically interlocked or operated by separate cylinders and are characterized by having relatively large movement capability of the clamping members for the pallet.

Registries of the second type, in which a group of registries is actuated by a single power means, are characterized by having the locating pins directly actuated by the common power means, while the clamp members are actuated by, or through, elastic members such as relatively low work output springs and the clamp member movement ranges are therefore relatively small. Accordingly, the amount of wear which can be tolerated on the clamp members and/or the associated clamp surface on the pallets is very small. Stated another way, a small amount of wear on either the clamp members or the associated clamp surface of the pallet will create a large change in the clamping force or even no clamping force at all. When the clamp surface of the pallet consists of one side of a horizontal plate member, known as a pallet foot, and the opposite side of the foot is the sliding surface on which the pallet slides from station to station, as is generally the case, then wear on this pallet foot slide surface and/or wear of the associated fixed rail further magnifies the problem of variable clamp force, or zero clamp force, due to wear. The aggregate wear on the slide rails, pallet foot, pallet clamp surface, and the clamp member greatly affects the clamp force because of the small amount of available clamp member movement. When the aggregate wear exceeds this clamp member movement, the clamp force drops to zero.

It is one object of this invention to provide a pallet registry design in which a group of registries may be ganged together and operated by a single power means while providing a clamp member movement of significantly greater range than those of present designs.

In present registry designs of the second type, in which multiple registries are operated by a single power means, the locating pins in each registry are directly actuated by that power means. Therefore, a slight mislocation of a pallet in any given registry will cause the entire power means to stall or break a component in the offending registry because all the force generated by the common power means is concentrated on the offending registry.

It is, therefore, another object of this invention to provide a pallet registry in which multiple registries are operated by a common power source, but the locating pins, as well as the clamp members, are independently actuated by individual internal elastic members when the common power source is operated.

In present registry designs, the clamp members are generally actuated by wedges, either straight line or circular, or screws, which are low efficiency mechanisms. Low efficiency refers to the fact that the work (force times distance) output from the mechanism is much less than the work into the mechanism, the loss being due to friction. Not only does the friction detract significantly from the theoretical force output of a wedge or screw mechanism, but variations in friction cause larger changes in the force output than such variations make in higher efficiency mechanisms.

It is a further object of this invention to provide a pallet registry in which the clamping force is transmitted from a power source to the clamp members through high efficiency mechanisms, such as simple levers, pivots, and rolling contacts.

In present registry designs, the reactive loads, due to the clamping forces, on the locating and structural components of the registry appear as significant bending loads thereon.

It is another object of this invention to provide a registry in which the bending loads due to clamping are primarily confined to members whose deflection does not affect the accuracy of pallet location, and in which the bending loads imposed on the locating and structural components of the registry are minimized to achieve lower deflections per unit of clamping force.

In many present registry designs, the transfer system operates above and through the pallet registry. Therefore, from a maintenance standpoint, in order to remove or replace a registry, it is necessary first to remove the transfer system, or parts of it, which increases the work and time required for maintenance.

It is, therefore, another object of this invention to provide a pallet registry which, by virtue of its inherent characteristics, can be made in two independent subassemblies which are mounted to the machine bed on each side of a substantially central transfer system, and one side or the other or both sides of the registry can be removed or replaced on the machine bed without removing the transfer system.

The movement of pallets through a transfer machine is presently accomplished in one of three ways: (1) they can be slid from station to station on fixed rails driven by a simple reciprocating transfer bar; or (2) they can be lifted and carried on transfer bars; or (3) they can be slide from station on rails which move through a small vertical stroke and utilize surfaces on the pallet which are different from the vertical locating surfaces. The first method, using fixed slide rails, suffers from the disadvantage of locating the pallets vertically on surfaces subject to wear, while the latter two methods have required more complex and expensive mechanisms.

It is another object of this invention to provide a simplified lift and carry type pallet transfer system or a vertically moving slide rail system, in which the vertical motion for either system, is generated by a simple addition to the registry actuation system.

Other objects of the invention will be apparent in the following description and claims in which, with the accompanying drawings, there is disclosed the principles of operation of the invention, together with details to enable a person skilled in the art to practice the invention all in connection with the best mode presently contemplated for the practice thereof.

BRIEF DESCRIPTION OF THE DRAWINGS:

DRAWINGS accompany the disclosure and the various views thereof may be briefly described as:

FIG. 4, a transverse partial vertical section taken on line 4—4 of FIG. 1.

FIG. 5, a partial horizontal section taken on line 5—5 of FIG. 2.

FIG. 6, a vertical section taken on line 6—6 of FIG. 4.

FIG. 7, a vertical section taken on line 7—7 of FIG. 6.

FIG. 8, a schematic elevation of the interconnecting and lift mechanism for a group of registry stations.

FIG. 9, a section analogous to FIG. 4 showing an alternate lift system.

FIG. 10, a vertical section taken on line 10—10 of FIG. 9.

DETAILED DESCRIPTION OF THE INVENTION AND THE MANNER AND PROCESS OF USING IT:

The locating and clamping technique and the mechanism which produces it is substantially identical with that disclosed in my copending application, Ser. No. 164,092, filed June 30, 1980. The novelty of the present invention lies in the technique and structure for actuating the locating and clamping mechanisms and coordinating it with one of two alternate methods of transporting the pallets from station to station without sliding it on surfaces which are the vertical locating surfaces. The first of these methods involves a lift and carry transfer bar system in which the lift motion is inherently generated by the actuation system for the locating and clamping mechanism for the registry.

Figure 1:
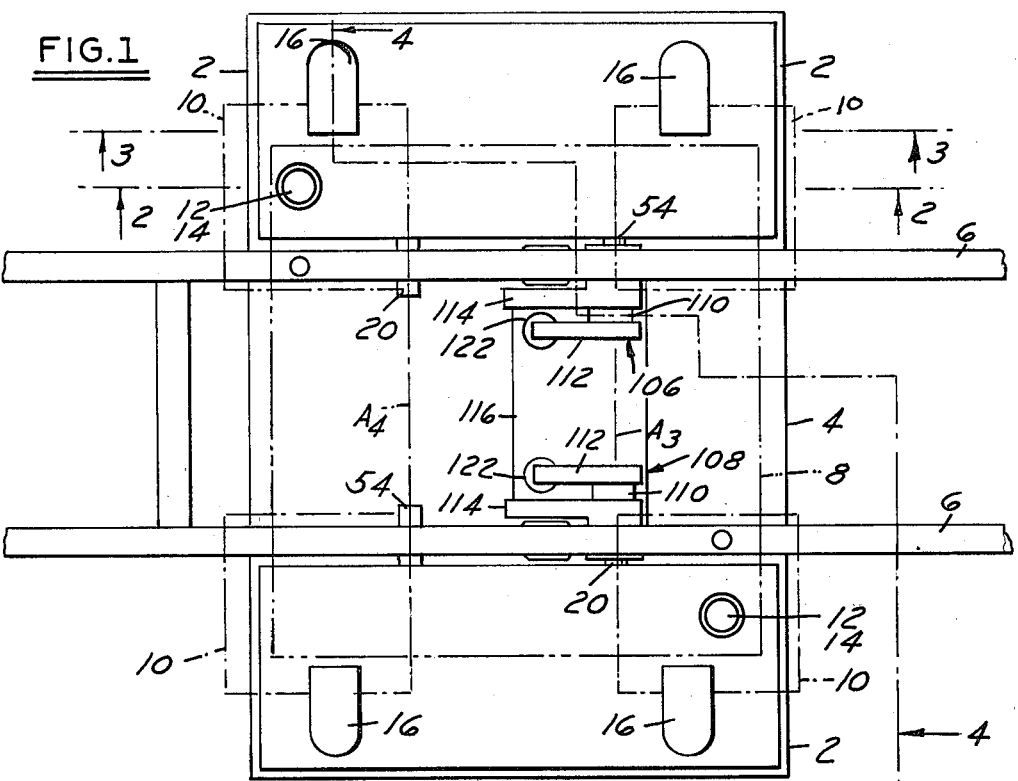
FIG. 1, a plan view of the registry and lift mechanism of the present invention.

A plan view of the registry mechanism is shown in FIG. 1. This is comprised of two identical housings 2 mounted on a machine base 4. Two lift and carry transfer bars 6, which carry the pallets 8 from station to station, operate between the registry housings 2 through a mechanism to be subsequently described. For some applications, the two identical housings 2 may be interconnected into a single unit without affecting the performance of the registry. The mechanism enclosed within either housing 2 is identical with the mechanism enclosed within the other housing 2.

Four foot members 10 mounted on the underside of a pallet 8 contact and are supported by support pads 11 (FIG. 4). Holes 12 in two of the pallet feet 10 can be engaged by vertically moving locator pins 14 to establish pallet location; and four vertically moving clamp members 16 can exert downward force on the upper faces of the pallet feet 10 to clamp them to the support pads 11.

Figure 2:
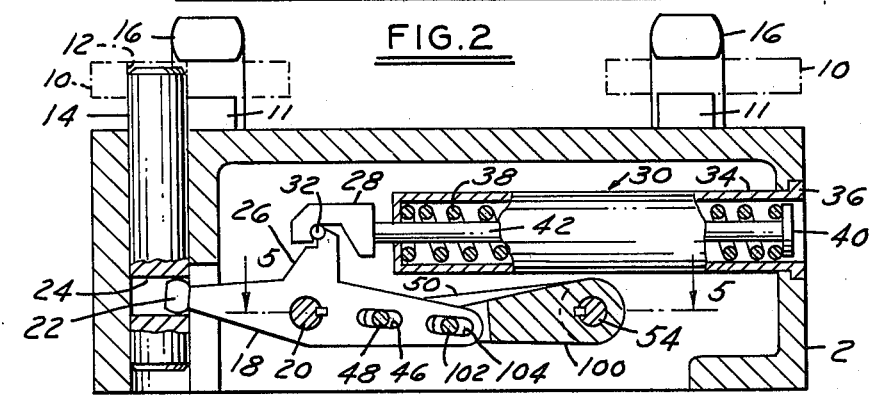
FIG. 2, a longitudinal vertical section taken on line 2—2 of FIG. 1.

Referring to FIG. 2, a master lever 18 is keyed on a primary shaft 20 journalled in the housing 2. This master lever directly actuates the locator pin 14 through a spherical sector 22 which engages a cylindrical hole 24 in the locator pin 14. An offset portion 26 of the master lever 18 is engaged by the nosepiece 28 of an elastic energy cartridge 30 through a wear pin 32.

The elastic energy cartridge 30 is comprised of a sleeve 34 which is flanged at one end 36 to bear against the housing 2. Mounted within the sleeve 34 is a compression spring 38, which bears on one end against the partially closed end of sleeve 34 and at its other end bears against a head 40 formed on the end of a pull rod 42; the other end of pull rod 42 is threaded in and locked to nosepiece 28. The compressing spring 38 is preloaded to a large degree during assembly prior to attachment of the nosepiece 28; or prior to attachment of the head 40 to the pull rod 42. It will be noted that even though the spring 38 operates in compression, the action of the entire cartridge is in tension, acting between the flange 36 and the nosepiece 28. This exerts a clockwise turning moment on the master lever 18 about pin 20. It will also be noted that the movement of pull rod 42 to the right is limited to the distance determined by nosepiece 28 which will contact the closed end of sleeve 34, at which position there is still considerable preload on spring 38. The preload is accomplished by an external assembly fixture of standard design which may be as simple as an arbor press to compress spring 38 during assembly. The practical advantage of using a preloaded spring cartridge is that it can be handled as a simple package during assembly of the registry, while still retaining the advantages of preload; this results in a more nearly flat force curve during the working stroke of the cartridge 30.

As noted above, the tensile force of the cartridge 30 exerts a clockwise moment on master lever 18 and extends the locating pin 14 upward into engagement with pallet foot member 10. This clockwise motion of master lever 18 also causes engagement of the clamp members 16 as will be described. The locating and clamping is accomplished entirely by the force and movement generated by the cartridge 30, to reach the position shown in FIG. 2.

Figure 3:
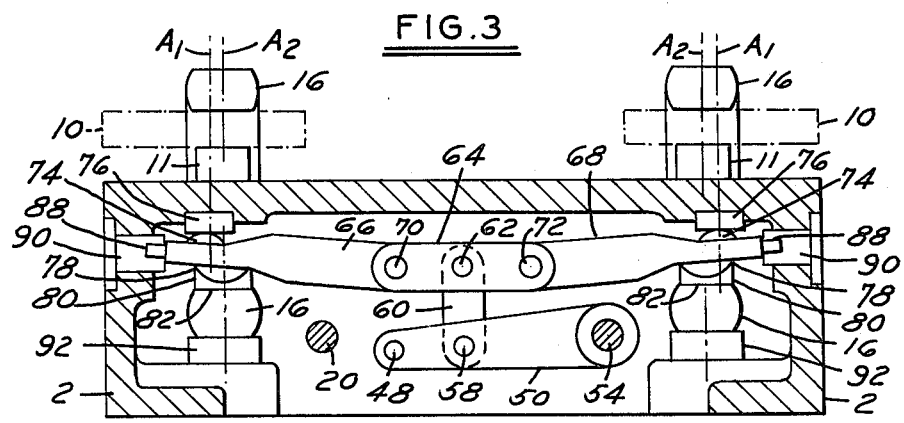
FIG. 3, a longitudinal vertical section taken on line 3—3 of FIG. 1.

A slot 46 is formed into the master lever 18 in the leg opposite the leg which engages the shot pin 14. This slot 46 is engaged by a pin 48 mounted at the outboard end of an intermediate lever 50 journalled on a secondary shaft 54, which is journalled in the housing. Referring also to FIGS. 3 and 5, a clamp link 60 is connected to the intermediate lever 50 through a pin 58. At its other end, the clamp link 60 is connected by pin 62 to an equalizing link 64, at or near its midpoint. Each end of equalizing link 64 is connected to clamp levers 66 and 68 by pins 70 and 72. Clamp levers 66 and 68 are symmetrically disposed about the longitudinal centerline and actuate two identical clamp mechanisms, only one of which need be described.

The clamp lever 66 has rigidly mounted to it a cylindrical convex member 74 which contacts a bearing pad 76 mounted in the housing 2. On the opposite side of clamp lever 66 is mounted a second cylindrical convex member 78 which makes area contact with a slipper member 80 whose upper surface is concave to mate with convex member 78. The lower side of slipper member 80 is convex at right angles to the upper concave surface. This lower convex surface of slipper member 80 mates with a concave surface 82 of clamp member 16 (FIG. 4). As can also be seen in FIG. 4, the clamp member 16 is a "C" shaped member whose upper inboard surface 84 contacts and clamps the pallet foot member 10 to the support pads 11; the clamp member 16 is mounted in the housing 2 through a resilient bushing 86 which permits adequate movement of clamp member 16.

It will be noted (FIG. 3) that the contact line between the convex member 74 and reaction pad 76 is on axis $A_1$ and that the effective axis of the bearing between the convex member 78 and the slipper 80 is along the axis $A_2$, which is the clamp axis. In effect, the clamp lever 66 acts as a simple lever having a fulcrum with respect to the housing 2 on axis $A_1$, an output movement on axis $A_2$, and an input movement on the axis of pin 70 which connects the equalizing link to the lever 66. It can be seen that there is a considerable force magnification or leverage from the downward force of pin 70 to the downward force on the clamp member 16, which is transmitted as a clamp force on the pallet foot member 10 by surface 84. Yet this force magnification is achieved with a simple lever which is a "high efficiency" mechanism.

The clamp action of the clamp lever 68 is the same as that of the clamp lever 66 except that its operation is symmetrically opposite. Substantially equal downward forces for clamping are applied by pins 70 and 72 on the clamp levers 66 and 68 by the equalizing link 64 which is pulled downward by link 60, intermediate lever 50, and pin 48 which is forced downward by slot 46 in master link 18 due to the clockwise torque exerted on this master link 18 by the spring cartridge 30.

It can be seen that the force generated by the spring cartridge 30 is transmitted to the pins 70 and 72 (FIGS. 2 and 3) by simple high efficiency levers such that the work (force times distance) delivered by spring cartridge 30 is decreased only slightly by friction when it appears at pins 70 and 72, and, due to the high efficiency of the clamp levers 66 and 68, when it appears as a clamp force at surface 84 on pallet foot member 10.

Stated another way, there is a large mechanical advantage in force transmittal from the spring cartridge 30 to the clamp surfaces 84, and this is only slightly less than the movement ratio of spring cartridge 30 to that of the clamp surfaces. It is well known that for a 100% efficient mechanism that:

$$\frac{\text{Input Movement}}{\text{Output Movement}} = \frac{\text{Output Force}}{\text{Input Force}}$$

Therefore, for a system of simple levers and pivots, with a minimum work loss due to friction, this force ratio will be only slightly less than the movement ratio.

Referring again to FIG. 3, the outboard end of lever 66 (and symmetrically opposite lever 68) is formed into a cylindrical extension 88 which fits into a resilient bushing 90 supported by the housing 2. The two resilient bushings 90 are made of neoprene or the like, and it is their function to establish the left to right position (FIG. 3) of levers 66 and 68 and equalizing link 64, yet permit sufficient float to allow a true rolling contact between convex member 74 and reaction pad 76 when the clamp forces are being reacted by this fulcrum interface. To further permit a true rolling contact at this same interface, the holes in levers 66 and 68 and/or the corresponding holes in equalizing link 64 for pins 70 and 74 are slightly elongated or made oversize.

The underside of the clamp member 16 is supported by a resilient bushing 92, also made of neoprene or the like. This bushing 92 permits downward movement of the clamp member 16 during clamping, absorbs deflections in the clamp member 16 during its delfection under clamp loads, and provides the return force on the clamp member 16 during unclamping, as is to be described.

It will be noted from FIG. 3 that the fulcrum axis $A_1$ is only slightly displaced from the clamping axis $A_2$. This accomplishes two important things: it provides a large mechanical advantage in generating the clamp force as previously described; and it generates a very small reactive bending load in the housing 2. This small bending load in the housing 2 in turn minimizes the reactive deflections therein, which is significant when high accuracy is required.

It will be noted from FIG. 4 that the clamp force applied to the clamp member 16 by the clamp lever 66 through the convex member 78 and slipper 80 is directly in line with the clamp surface 84, on clamp axis $A_2$. This, of course, is what dictates the "C" shape of the clamp member 16. This clamp member 16 will deflect due to the clamp forces it is transmitting, but, because of its mounting into the housing 2 through the resilient bushings 86 and 92, deflection of the clamp member 16 causes negligible loads on the housing 2.

In essence then, this clamping system creates the theoretically most nearly perfect system to minimize deflection of the housing 2 due to the clamp forces. The largest load on the housing 2 due to the clamp forces is an almost pure compressive load which is experienced as a reactive load between the reaction pad 76 and the support pads 11.

It can be seen from the above mechanism description that the locating pins 14 are extended and the clamp members 16 exert their clamp force on the pallet foot members 10 due to the elastic work of the spring cartridge 30 which produces a clockwise movement and exerts a clockwise force for clamping on the master lever 18. The force and movement for unclamping and withdrawal of the locating pins 14 is provided through the actuation of the primary shaft 20 as will be subsequently described.

Referring to FIGS. 2 and 5, a secondary lever 100 is keyed to the secondary shaft 54 which is journalled in the housing 2. The outboard end of this lever 100 is formed into a clevis through which passes a coupling pin 102. This coupling pin 102 passes through a slot 104 in the master lever 18 and is located substantially midway between shafts 20 and 54. This interconnection between shafts 20 and 54 through levers 18 and 100 is such that a rotation of one shaft produces a substantially equal and opposite rotation of the other shaft through the relatively small angles that are required for the registry operation.

It is clear therefore that the registry can be unclamped and the locating pin withdrawn by an externally powered counterclockwise rotation of shaft 20, or by an equal clockwise rotation of shaft 54 (FIG. 2), or, viewed differently, it may be stated that the unclamping and locating pin withdrawal may be accomplished by rotating either shaft such that the bottom of the shaft rotates towards the centerline of the registry.

Since a total registry is comprised of two identical mechanisms or halves, with one rotated 180° with respect to the other, FIG. 1, it can also be seen that the axis of the primary shaft 20 of one half is coincident with the axis of the secondary shaft 54 of the other half in two places. The total registry, comprised of the two halves can be actuated on either of these two axes, noted as $A_3$ and $A_4$ in FIGS. 1, 4 and 9.

Referring to FIGS. 1, 4, 6 and 7, two symmetrically opposite shaft drive arms 106 and 108 are keyed to the external portions of the shafts 54 and 20 on the two registry halves. Each drive arm 106 and 108 is comprised of a cylindrical sleeve 110 and an offset arm 112. The inner diameter of each sleeve 110 is keyed to its mounting shaft, and an adapter block 114 is journalled on its outside diameter. Both adapter blocks 114 are bolted to an actuator link 116, forming an actuator assembly 118. The actuator assembly 118 can be seen to be rotatable about axis $A_3$ through the journal connection between the two blocks 114 and the outer diameters of the sleeves 110 of the drive arms 106 and 108. A roller 120 is mounted to each block 114 and supports a lift and carry transfer bar 6 earlier noted. Referring to FIG. 6, a contact block 122 is mounted to the actuator link 116; the upper surface of this contact block is adapted to contact the offset portion of the offset arm 112 of the drive arm 106 keyed on shaft 54. A symmetrical opposite arrangement is used on the other side of the actuator link 116, where the sleeve 110 of the drive arm 108 is mounted on the shaft 20 of the other registry half.

As the actuator link 116 is externally driven in a clockwise direction about the pivot axis $A_3$ (as viewed in FIG. 6), the contact block 122 drives the arm 112 with it; this movement is transmitted through the sleeve 110 to the shaft 54 which, as will be recalled, withdraws the locating pin 14, unclamps (raises) the clamp members 16 and energizes the spring cartridge 30. Similarly on the other side of actuator link 116, the same functions occur on the other registry half, except that the driving movement takes place on the primary shaft 20. This rotation of the actuator link 116 also raises the rollers 120 lifting the transfer bars 6.

As the actuator link 116 is driven in the opposite or counterclockwise direction, as viewed in FIG. 6, the rollers 120 lower the transfer bars 6. This same motion permits the spring cartridges within the registry halves 2 to raise the locator pins 14 and lower the clamp members 16, as controlled by the movement of drive arm 112 in contact with the block 122. As the clamp members 16 contact the pallet feet 10, further motion of the mechanisms within the housings 2, as driven by the spring cartridges is prevented and the rotation of the shafts 20 and 54 stops. Each registry half is then at its own equilibrium position with the spring cartridge controlling the force exerted by the clamp members on the pallet feet. During this interval, and until clamp equilibrium is achieved, the rotation of the actuator link takes place through the rotation of shafts 20 and 54 within the housings 2.

Slight further rotation of the actuator link 116 about axis $A_3$, after clamp equilibrium is independently reached in each registry half, takes place in the journal connection between the outside diameter of the sleeves 110 and the adapter blocks 114. The shafts 20 and 54 and the drive arms 106 and 108, keyed thereon, are stationary at this time. This causes a gap to open between the top surface of the block 122 and the mating contact surface of the offset arm 112. This gap is variable and is dependent on the slight dimensional variations or tolerances in the thickness of the pallet feet 10 and other details in the mechanism. It will also change with time due to the wearing of the components which determine the exact equilibrium position of a pallet and registry combination. In any case, the clamp force is determined by the spring cartridge 30 at the equilibrium position, and the external mechanism, exemplified by the actuator link 116, positively drives the registries to their full unclamped position and withdraws the locating pin, while the opposite motions are driven by the spring cartridges within the registry halves until an equilibrium condition is reached.

As noted above, the actuator link 116, in addition to operating the registries, raises and lowers the transfer bars 6 through the rollers 120. Referring to FIG. 4, a series of transfer pins 124 are mounted on the transfer bars 6 and are spaced to engage mating holes 126 in the pallet feet 10.

Referring to FIG. 8, there is shown a schematic vertical section through three stations of an illustrative transfer machine; three machine bases 4 are interconnected by tie bars 130. Each base 4 supports two registry half housings 2 on its upper surface. The transfer bars 6 are supported by the rollers 120 on the actuator assemblies 118 as previously noted. At one end the transfer bars 6 are driven by an illustrative mechanism comprised of a drive bracket 132 and drive cylinder 134 which is clevis or trunnion mounted to accommodate the small vertical motion of the transfer bars 6. A variety of reciprocating drive mechanisms may be used in place of the cylinder 134 such as the mechanism of my U.S. Pat. No. 3,789,676 with a suitable connector link to accommodate the small vertical motion.

The lower ends of the actuator assemblies 118 are connected together by multiple pin connected links 136; this parallelogram linkage assembly is driven by a driver link 138 which in turn is driven by a crank 140 and crankpin 142. The crank 140 is mounted on the output shaft 144 of a gear reducer 146. This gear reducer is driven by an electric motor 148 through belts and pulleys 150. This drive mechanism, comprised of crank, gear reducer, and associated items 140–150, is again illustrative only. A cylinder or other suitable prime mover could also be used.

The mechanism assembly of FIG. 8 is shown with the crank 140 in the 6 o'clock position; i.e., with the crankpin 142 directly below the shaft 144, which is the approximate midstroke of the mechanism. With the crank 140 in the 9 o'clock position, i.e., with the crank 140 horizontal and the crankpin 142 to the left of the shaft 144, the actuator assemblies 118 are in their most clockwise position about their axes of rotation, the axes of shafts 20 and 54. In this position, the rollers 120 are in their highest position together with transfer bars 6 and the pallets are slightly lifted from the locator pads 11 in the registries.

With the transfer bars 6 in this full up position, the transfer pins 124 have engaged the holes 126 in the pallet feet 10. It will be recalled that with the shafts 20 and 54 in this position, the clamp members 16 are fully disengaged from the top of the pallet feet 10 and that the master levers 18 have pulled the locator pins to their full down positions, at which point they are fully withdrawn from the holes in the pallet feet 10. With the registries and the transfer bars in these aforementioned positions, the cylinder 134 extends to advance all pallets one station forward.

At the completion of this forward stroke, the crank 140 is rotated from the 9 o'clock position to the 3 o'clock position, i.e., with the crank 140 horizontal and the crankpin 142 to the right of the shaft 144. This moves the actuator assemblies 118 to their most counterclockwise position about their axes of rotation, and lowers the rollers 120 and the transfer bars 6 to their lowermost position as shown in the sectional view (FIG. 4).

During the rotation of the crank 140 from the 9 o'clock position to the 3 o'clock position, and the movement of the actuator assemblies 118 from their most clockwise position to their most counterclockwise position, the following events occur in this specific sequence:

1. The rollers 120 move downward lowering the transfer bars and pallets until the pallet feet 10 contact the support pads 11, whereupon the pallet becomes supported by these support pads while the rollers 120 and transfer bars 6 continue downward.
2. During this same interval, the locator pins 12 move upward and enter the holes 14 in the pallet feet 10, and have entered partially before the transfer pins 124 have moved downward and clear of the holes 126 in the pallet feet 10.
3. Again during this same interval, the clamp members move downward but more slowly than the transfer bars 6 because of their smaller vertical stroke. They do not contact the top of the pallet feet until the approximate final one-third of the total interval, at which point an equilibrium position is reached and the spring cartridge 30 stops moving. The continued movement of the actuator assemblies 118 to the end of their stroke causes a gap to develop between the blocks 122 and the offset arms 112 as earlier described.

In essence then, all three movements: lower pallets, raise locator pins, and lower clamp members, begin simultaneously but end in the following order: pallets supported by locator pads, pallet located by locator pins, pallet clamped by clamp members, and transfer bars reach full down position.

With the transfer bars in their lowermost position, the transfer pins 124 are clear of the holes 126 in the pallet feet 10 and the transfer bars 6 are returned or retracted to their starting position by the cylinder 134. It is during this interval that the work is performed on the workpieces in the pallets at the various stations.

At the completion of this work cycle and after the return of the transfer bars 6, the crank 140 is rotated from the 3 o'clock position to the 9 o'clock position. This unclamps the registries, withdraws the locator pins, and lifts the rollers, transfer bars and pallets, ready for the next forward stroke of the transfer bars.

It can be seen that the motion of the transfer bars is a true lift and carry system for the pallets and that the lift and lower motion of the transfer bars is automatically generated and actuated by the inherent actuating mechanism for the registries themselves. This is accomplished by utilizing a shaft type input for the registries which is transverse to the direction of pallet transfer through the machine and adding two rollers offset from the centerlines of the shaft such that the shaft rotation generates the amount of lift required.

The significant advantage of a lift and carry transfer system, as compared to the more conventional and less expensive system in which the pallets are moved from station to station by being slid on stationary transfer rails, is that in the lift and carry system the surfaces which establish the vertical position of a pallet in a registry are not subject to wear, while in the slide system both the feet and rails are subject to wear and the vertical location of a pallet changes with time.

A system in which the pallets are not lifted and carried, but are slid along rails which move through a small vertical stroke, and in which the pallets are vertically located on surfaces other than the sliding surfaces and in which vertical pallet location is not degraded by wear, was disclosed in my U.S. Pat. No. 4,201,284.

This lift and slide technique is also usable with the registry actuation system disclosed herein. Referring to FIG. 9 which is analogous to FIG. 4 of the basic embodiment, the internal mechanisms within the housings 2 are identical with those previously described. The input shafts 20 and 54 are again actuated by drive arms 106 and 108, keyed thereon, and operated through the lost motion connection of offset arms 112 and contact blocks 122. However, the adapter blocks 114 are replaced by eccentric adapters 152 which are connected to the actuator link 116. The eccentric adapters 152 are journalled on the cylindrical sleeve portion 110 of the drive arms 106 and 108, and a cylindrical portion 154 is formed on the eccentric adapters 152 which is parallel to, but eccentric with, the internal diameters which are journalled on the sleeves 110. Two transfer rail supports 156 are journalled on the eccentric cylindrical portions 154 of the eccentric adapters 152; and these supports are bolted or otherwise connected to the transfer rails 158. It will be understood that these transfer rails 158 are not moved longitudinally along the transfer line (as had been the lift and carry transfer bars 6) but merely are moved up and down through a substantially vertical stroke by the eccentricity of the journal between the cylindrical portion 154 of the eccentric adapters 152 and the transfer rail supports 156, relative to the axis of rotation, as the actuator link 116 moves through its working angle. The transfer rails 158 are shown in their lowermost position in FIG. 9 which corresponds to the pallet "located and clamped" condition of the registry; a slight gap then exists between the top of the transfer rails 158 and the bottom of the pallet feet 10.

A conventional reciprocating transfer bar 160 operates in the space between two sides of the registry; this transfer bar is driven by a cylinder or other type of reciprocating mechanism previously noted. Transfer fingers 162 are intermittently spaced along the bar and are adapted to engage blocks 164 mounted on the underside of each pallet when the transfer bar is rotated about its own axis by a suitable conventional mechanism. With the transfer bar rotated as shown in FIG. 9, these fingers are disengaged from the pallet blocks 164; this is the position of the transfer bar during its return stroke.

At or near the completion of a work cycle, the transfer bar is rotated such that the fingers engage the pallet blocks; at the completion of the work cycle, the registries unclamp the pallets and withdraw the locating pins. This is caused by the rotation of actuator links 116 which also lifts the transfer rails through a small vertical stroke through the eccentricity of the eccentric adapters. The pallets are slightly lifted from the support pads 11. This slight upward motion is accommodated by the fingers 162 on the transfer bar. Rotation of the transfer bar 160 causes fingers 162 to be positioned to contact pallet blocks 164 and all pallets are transferred forward one station, actuated by the forward motion of the transfer bar 160, while the pallets are supported by and slide on the transfer rails in their up position. At the completion of this forward stroke, the links 116 rotate in the opposite direction, lowering the transfer rails, lowering the pallets to the support pads 11, and actuating the registries, i.e, raising the locator pins and lowering the clamp members. The transfer bar fingers 162 are rotated clear of the pallet blocks 164 and the transfer bar is retracted to its starting position.

In essence, this sequence is identical with the lift and carry system insofar as registry movements are concerned; the difference involves the mode of pallet transfer. Whereas in the true lift and carry system, the pallet feet are engaged by pins in the transfer bars and these bars carry the pallets from station to station; in the vertically moving rail system, a smaller vertical rail stroke is required and the pallets are slid along the rails. In either case, it will be noted that the support pads in the registries do not coincide with the carry surfaces or slide surfaces on the pallet feet, and vertical location is not subject to degradation as in the conventional sliding pallet systems.

I claim:

1. In a multiple station transfer machine in which workpieces are located and supported in pallets, and in which said pallets are moved in sequence through said machine, utilizing, in part, vertically moving transfer means, interrelated registry mechanisms for locating and clamping said pallets, each of which comprises:
   (a) a registry frame,
   (b) one or more locating pin means slidably mounted in said frame to engage corresponding locating holes in said pallet,
   (c) clamping means for said pallet movably mounted in said frame,
   (d) energy storage means mounted in said frame,
   (e) mechanical means interconnecting said energy storage means with said locating pin means and with said clamping means to sequentially engage said locating pins in said holes in said pallet and clamp said pallet to said registry frame, and that improvement which comprises:
   (a) external actuating means for said registry interconnected with and operating said mechanical means to retract said clamping means from said pallet and thereafter to disengage said locating pin means from said holes, said external actuating means comprising a shaft rotatable about an axis extending transversely to the line of transfer of said transfer machine and having a short actuator arm extending therefrom, and
   (b) lift means for said transfer means substantially contiguous with said external actuating means and operatively associated with said external actuating means comprising a lever having a fulcrum portion rotatable on said shaft, said lever having a long arm on one side of said fulcrum to be actuated by a power system, a first short arm on the other side of said fulcrum to contact and actuate said actuator arm to rotate said shaft, and a second portion eccentric to said shaft to provide a lift member for said transfer means, said lift means being sequentially interrelated with said clamping means and said locating pin means to raise said transfer means after said clamping means are retracted and said locating pin means are disengaged.

2. A transfer machine and registry mechanisms as defined in claim 1 in which said transfer means comprises lift and carry transfer bar means which transfer pallets from station to station by a lift and carry movement whereby said transfer bar means lift the pallets with a substantially vertical motion from said registry mechanism, then transfer said pallets forward one station in a substantially horizontal motion while carrying said pallets, then lowering said pallets to said registries in a substantially vertical motion, and then returning to their original starting position in a substantially horizontal motion while not carrying said pallets, and in which said lift members support said lift and carry transfer bar means whereby said lift members generate the aforesaid vertical motions of said lift and carry transfer bar means.

3. A transfer machine and registry mechanisms as defined in claim 1 in which said transfer means comprises slide rails moved through a small vertical stroke only, and a horizontally movable transfer bar, selectively engageable with said pallets, in area spaced from the clamping areas on said pallet, whereby said transfer rails are moved vertically upward to lift said pallets from said registry mechanism, and said transfer bar, in engagement with said pallets, moves said pallets forward by sliding said pallets on said slide rails in their upper position, and said slide rails are moved vertically downward depositing said pallets on said registries, and said transfer bar, disengaged from said pallets, returns horizontally to its starting position, and said lift means support said slide rails to generate the aforesaid vertical movements of said slide rails.

4. In a multiple station transfer machine in which workpieces are located and supported in pallets, and in which said pallets are moved in sequence through said machine, utilizing, in part, vertically moving transfer means, interrelated registry mechanisms for locating and clamping said pallets, each of which comprises:
   (a) a registry frame,
   (b) one or more locating pin means slidably mounted in said frame to engage corresponding locating holes in said pallet,
   (c) clamping means for said pallet movably mounted in said frame,
   (d) energy storage means mounted in said frame,
   (e) mechanical means interconnecting said energy storage means with said locating pin means and with said clamping means to sequentially engage said locating pins in said holes in said pallet and clamp said pallet to said registry frame, and that improvement which comprises:
   (a) external actuating means for said registry interconnected with and operating said mechanical means to retract said clamping means from said pallet and thereafter to disengage said locating pin means from said holes,
   (b) lift means for said transfer means substantially contiguous with said external actuating means, and sequentially interrelated with said clamping means and said locating pin means to raise and transfer means after said clamping means are retracted and said locating pin means are disengaged,
(c) said external actuating means comprising a shaft rotatable about an axis substantially perpendicular to the line of transfer of said transfer machine, and said lift means comprising lift members eccentric from the axis of said rotatable shaft,
(d) said transfer means comprising slide rails moved through a small vertical stroke only, and a horizontally movable transfer bar, selectively engageable with said pallets, whereby said transfer rails are moved vertically upward to lift said pallets from said registry mechanism, and said transfer bar, in engagement with said pallets, moves said pallets forward by sliding said pallets on said slide rails in their upper position, and said slide rails are moved vertically downward depositing said pallets on said registries, and said transfer bar, disengaged from pallets, returns horizontally to its starting position, and said lift members support said slide rails to generate the aforesaid vertical movements of said slide rails, and
(e) said lift members comprising circular eccentric members journalled in brackets connected to and supporting said slide rails.

* * * * *